(12) United States Patent
Takahashi et al.

(10) Patent No.: US 11,761,804 B2
(45) Date of Patent: Sep. 19, 2023

(54) ULTRASONIC FLOWMETER HAVING A PARTITION PLATE DIVIDING THE FLOW PATH INTO A MEASUREMENT FLOW PATH AND A NON-MEASUREMENT FLOW PATH

(71) Applicant: Panasonic Intellectual Property Management Co., Ltd., Osaka (JP)

(72) Inventors: Yukihide Takahashi, Nara (JP); Hiroshi Nakai, Osaka (JP); Kenji Yasuda, Kyoto (JP); Takashi Kayaba, Kyoto (JP); Yuki Anan, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 17/261,115

(22) PCT Filed: Aug. 26, 2019

(86) PCT No.: PCT/JP2019/033328
§ 371 (c)(1),
(2) Date: Jan. 18, 2021

(87) PCT Pub. No.: WO2020/054383
PCT Pub. Date: Mar. 19, 2020

(65) Prior Publication Data
US 2021/0325217 A1    Oct. 21, 2021

(30) Foreign Application Priority Data
Sep. 10, 2018 (JP) ................................. 2018-168429

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS 6,748,811 B1 * 6/2004 Iwanaga ................. G01F 1/662
                                                                73/861.27
7,237,441 B2 * 7/2007 Umekage ................ G01F 1/667
                                                                73/861.27

(Continued)

FOREIGN PATENT DOCUMENTS

EP     2 180 298     4/2010
JP     9-43015      2/1997

(Continued)

OTHER PUBLICATIONS

International Search Report of PCT application No. PCT/JP2019/033328 dated Sep. 17, 2019.

(Continued)

*Primary Examiner* — Harshad R Patel
(74) *Attorney, Agent, or Firm* — Wenderoth, Lind & Ponack, L.L.P.

(57) ABSTRACT

An ultrasonic flowmeter includes flow path that has a rectangular cross section and through which a fluid to be measured flows, and partition plate that divides flow path into measurement flow path and non-measurement flow paths. In addition, the ultrasonic flowmeter includes a pair of ultrasonic sensors that are arranged upstream and downstream of a surface forming flow path and transmitting and receiving ultrasonic signals, and a flow rate calculator that detects a flow rate of the fluid to be measured based on a propagation time. The ultrasonic flowmeter includes openings that connect measurement flow path, non-measurement (Continued)

flow paths, and a space where the ultrasonic sensors is located, and the ultrasonic sensors mainly propagate ultrasonic waves only to measurement flow path through openings.

8 Claims, 6 Drawing Sheets

(56) References Cited

U.S. PATENT DOCUMENTS

| | | | |
|---|---|---|---|
| 7,913,575 | B2 | 3/2011 | Iwanaga et al. |
| 9,091,575 | B2* | 7/2015 | Adachi ............... G01F 1/66 |
| 2006/0201259 | A1* | 9/2006 | Umekage ............ G01F 1/667 |
| | | | 73/861.27 |
| 2007/0193367 | A1 | 8/2007 | Umekage et al. |
| 2018/0188086 | A1* | 7/2018 | Sugiyama ........... G01F 1/662 |

FOREIGN PATENT DOCUMENTS

| | | | |
|---|---|---|---|
| JP | 2004-101542 | 4/2004 | |
| JP | 2004-144701 | 5/2004 | |
| JP | 2004-264064 | 9/2004 | |
| JP | 2007-240504 | 9/2007 | |
| JP | 4424936 | 3/2010 | |
| JP | 2017-015475 | 1/2017 | |
| WO | WO-2004074783 A1 * | 9/2004 | ............ G01F 1/662 |

OTHER PUBLICATIONS

Extended European Search Report dated Oct. 6, 2021 in corresponding European Patent Application No. 19860349.0.
Office Action dated Jun. 13, 2023 in corresponding European Patent Application No. 19860349.0.

* cited by examiner

ULTRASONIC FLOWMETER HAVING A PARTITION PLATE DIVIDING THE FLOW PATH INTO A MEASUREMENT FLOW PATH AND A NON-MEASUREMENT FLOW PATH

CROSS-REFERENCE TO RELATED APPLICATIONS

This application is a U.S. national stage application of the PCT International Application No. PCT/JP2019/033328 filed on Aug. 26, 2019, which claims the benefit of foreign priority of Japanese patent application No. 2018-168429 filed on Sep. 10, 2018, the contents all of which are incorporated herein by reference.

TECHNICAL FIELD

The present disclosure relates to an ultrasonic flowmeter in which a flow path is divided into multiple layers and a flow rate is measured by an ultrasonic sensor.

BACKGROUND ART

As a conventional ultrasonic flowmeter, there is an ultrasonic flowmeter in which a flow path is divided into a plurality of flow paths by a partition plate to form a multi-layer flow path, and ultrasonic signals are propagated to a part of or all of layers of the multi-layer flow path to measure a flow rate (for example, see PTLs 1 and 2).

Figure 6A:
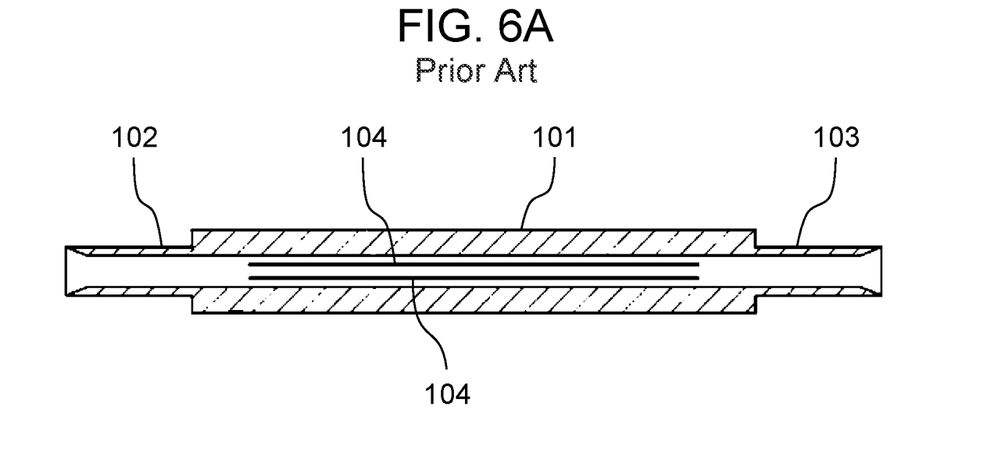
FIG. 6A is a cross-sectional view illustrating an external configuration of a measurement portion included in a conventional ultrasonic flowmeter.
Figure 6B:
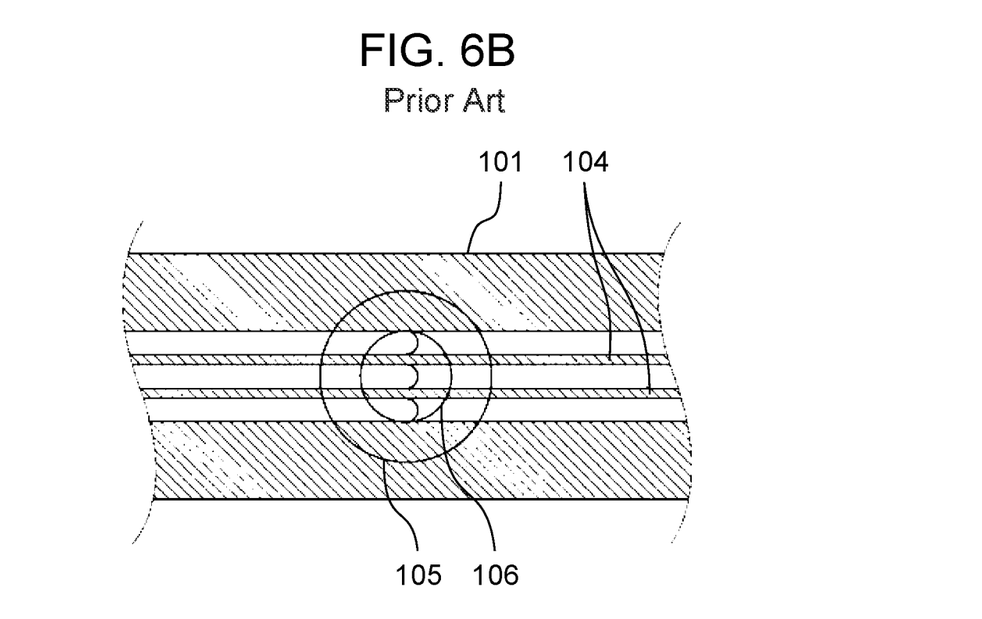
FIG. 6B is an enlarged view of a main part of FIG. 6A.

FIG. 6A is a cross-sectional view of a flow path included in a conventional ultrasonic flowmeter described in PTL 1, and FIG. 6B is an enlarged view of a main part of FIG. 6A.

Flow path 101 is divided by partition plates 104. Ultrasonic sensors 105 are mounted on flow path 101 one by one upstream and downstream of the flow path, and ultrasonic sensor 105 includes piezoelectric element 106. Ultrasonic waves reach a receiving side from a transmitting side, and a flow rate of a fluid to be measured is calculated based on a propagation time.

Ultrasonic waves generally have high straightness, and are mainly transmitted and received vertically from a vibration surface of the piezoelectric element. In PTL 1, in consideration of a case where a flow velocity ratio between layers of the divided flow path is not constant, the vibration surface of the piezoelectric element has a size that spans all layers of the divided flow path so as to measure all layers.

Figure 7A:
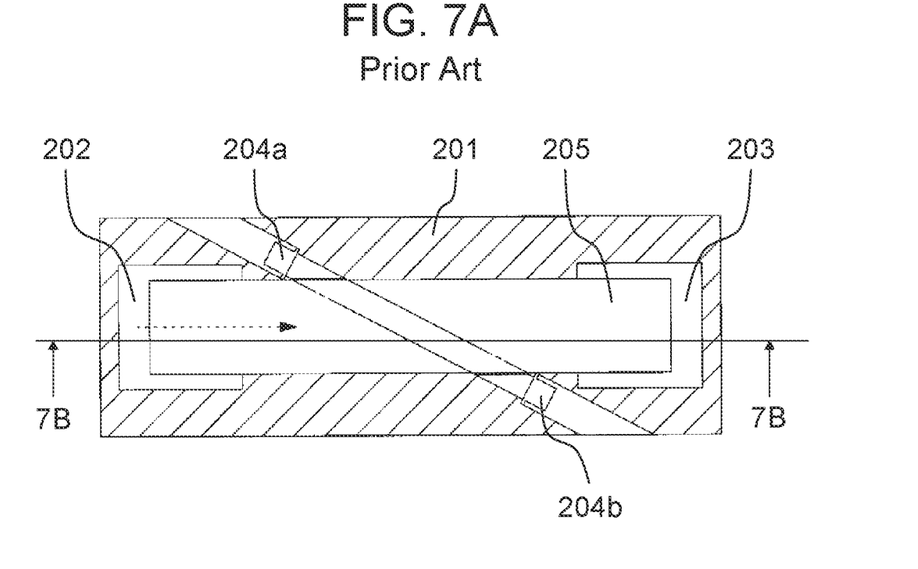
FIG. 7A is a cross-sectional view of a conventional ultrasonic flowmeter.
Figure 7B:
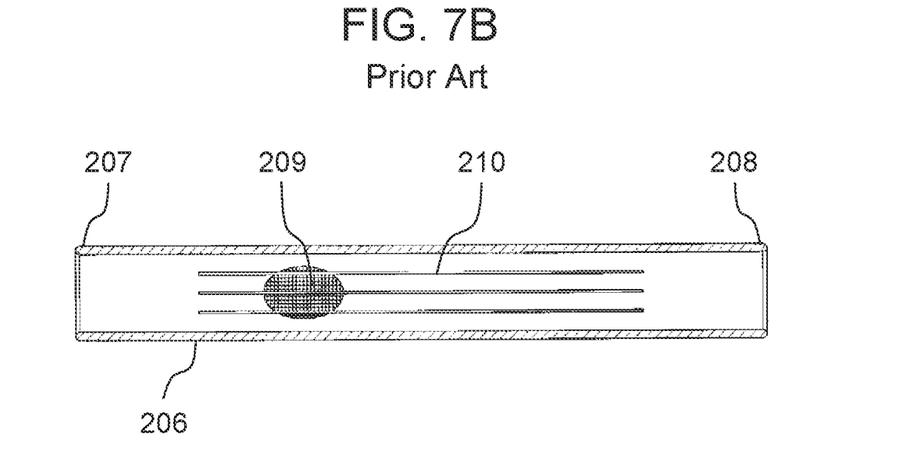
FIG. 7B is a cross-sectional view taken along line 7B-7B of FIG. 7A.

FIG. 7A is a cross-sectional view of a flow path portion of a conventional ultrasonic flowmeter described in PTL 2. FIG. 7B is a cross-sectional view taken along line 7B-7B of FIG. 7A.

Measurement flow path body 205 is held in measurement portion 201, and ultrasonic sensors 204a, 204b are mounted on measurement portion 201 so that the ultrasonic waves are transmitted and received through opening 209 of measurement flow path body 205. Measurement flow path body 205 is divided into four layers by partition plates 210, and a wave transmission/reception surface mainly faces two adjacent layers in the center. In addition, it is not necessary that cross-sectional areas of the four layers are all the same.

CITATION LIST

Patent Literature

PTL 1: Unexamined Japanese Patent Publication No. 2007-240504
PTL 2: Unexamined Japanese Patent Publication No. 2004-264064

SUMMARY OF THE INVENTION

However, as shown in PTL 1, if all layers are measured, the piezoelectric element having a size that spans all layers is required, which is costly.

Furthermore, as shown in PTL 2, if the opening is provided only to a part of the layers of the multi-layer flow path to perform measurement, only the layer having the opening is influenced by a flow or vortex generated in the opening, which influences the flow velocity ratio between the layers. Since how the flow velocity ratio is influenced differs not only depending on the flow rate but also depending on various factors such as the gas type and temperature, it is difficult to correct the flow velocity ratio with software, and there is a problem that errors and variations occur in the measured flow rate.

The present invention provides an ultrasonic flowmeter capable of measuring a flow rate with high accuracy by eliminating a difference in influence by an opening on the flow velocity of a measurement flow path and a non-measurement flow path to suppress variations in a flow velocity ratio while reducing costs as compared with a conventional ultrasonic flowmeter.

An ultrasonic flowmeter of the present disclosure includes a flow path that has a rectangular cross section and through which a fluid to be measured flows, a partition plate that divides the flow path into a plurality of layers to form layered flow paths, and a pair of ultrasonic sensors that are arranged upstream and downstream of a surface forming the flow path and transmitting and receiving ultrasonic signals. Furthermore, the ultrasonic flowmeter of the present disclosure includes a flow rate measurer that detects a flow rate of the fluid to be measured based on a propagation time from when the ultrasonic signals are transmitted from one of the pair of ultrasonic sensors until when the ultrasonic signals are received by another one of the pair of ultrasonic sensors after propagating through the fluid to be measured, mounting portions that mount the ultrasonic sensors on the flow path, and openings that are provided directly below the mounting portions and through which ultrasonic waves pass. Furthermore, each of the openings has a size facing a plurality of layers of the layered flow paths, and the ultrasonic sensors mainly propagate the ultrasonic waves only to a part of the layers of the layered flow paths. With this configuration, the ultrasonic flowmeter of the present disclosure can measure a flow rate with high accuracy by suppressing variations in a flow velocity ratio between a measurement flow path and a non-measurement flow path while reducing costs as compared with a conventional ultrasonic flowmeter.

DESCRIPTION OF EMBODIMENT

Hereinafter, an exemplary embodiment will be described with reference to the drawings.

Exemplary Embodiment

Figure 1:
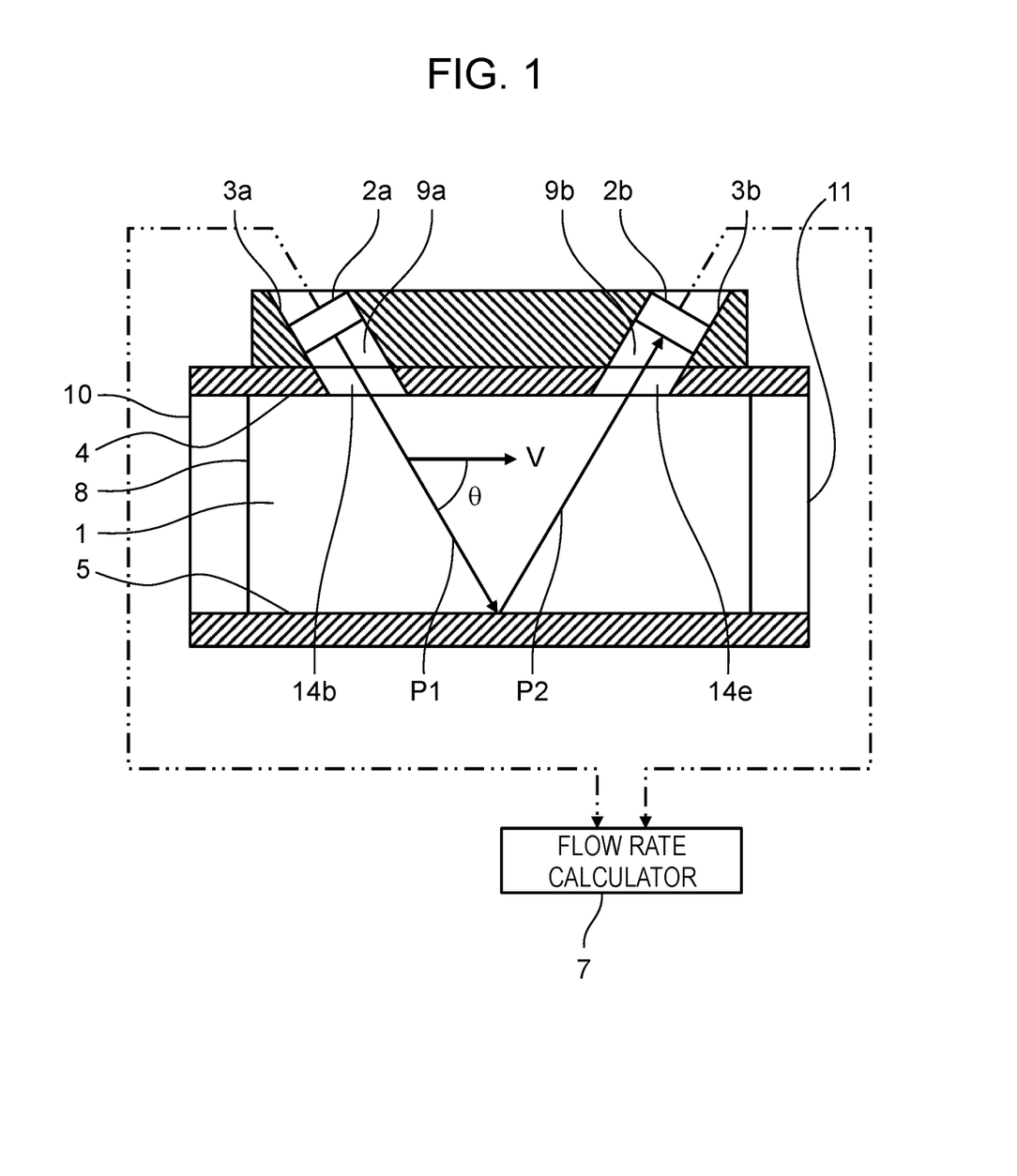
FIG. 1 is a configuration diagram of an ultrasonic flowmeter according to an exemplary embodiment.
Figure 2A:
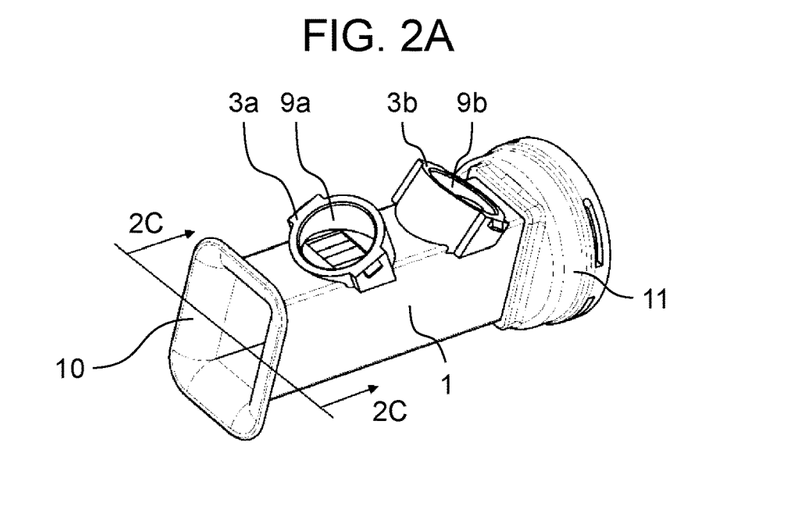
FIG. 2A is a perspective view of a flow path of the ultrasonic flowmeter according to the exemplary embodiment.
Figure 2B:
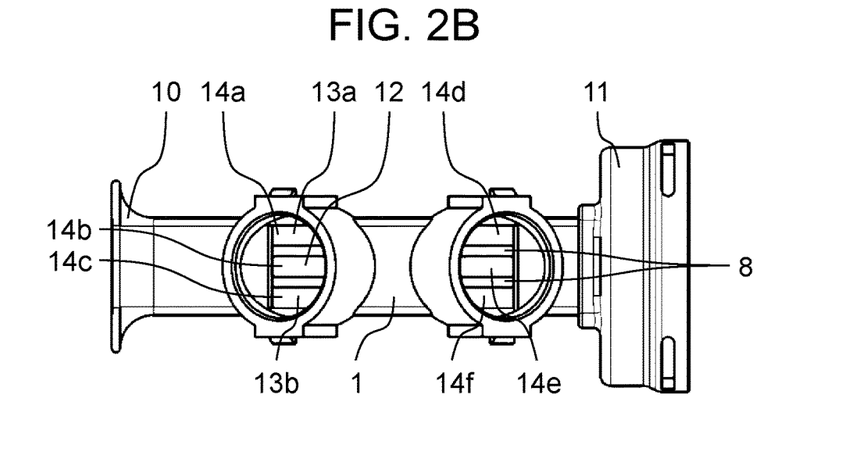
FIG. 2B is a plan view of the flow path of the ultrasonic flowmeter according to the exemplary embodiment.
Figure 2C:
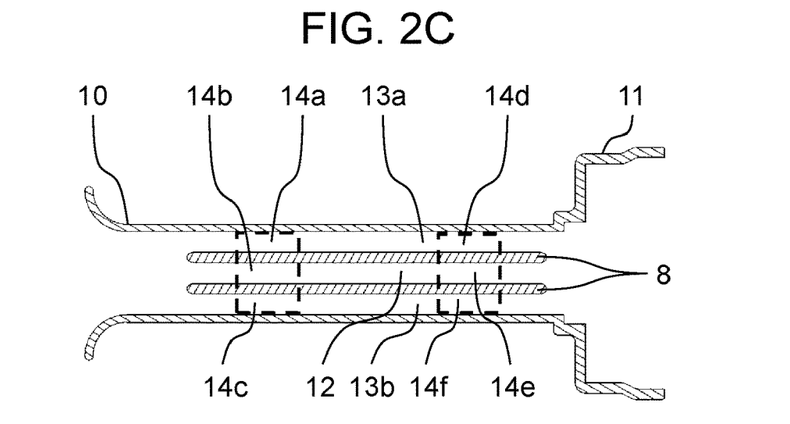
FIG. 2C is a cross-sectional view taken along line 2C-2C of FIG. 2A.

FIG. 1 is a configuration diagram of an ultrasonic flowmeter according to an exemplary embodiment. FIG. 2A is a perspective view of a flow path of the ultrasonic flowmeter according to the exemplary embodiment. FIG. 2B is a plan view of the flow path of the ultrasonic flowmeter according to the exemplary embodiment. FIG. 2C is a cross-sectional view taken along line 2C-2C of FIG. 2A.

An ultrasonic flowmeter of the present exemplary embodiment includes flow path 1, a pair of ultrasonic sensors 2a, 2b, and flow rate calculator 7.

Flow path 1 is formed with mounting portions 3a, 3b that mount ultrasonic sensors 2a, 2b, two partition plates 8 that divide flow path 1 into three layered flow paths 12, 13a, 13b, flow path inlet 10, and flow path outlet 11.

The pair of ultrasonic sensors 2a, 2b transmit and receive ultrasonic waves to each other. For example, the ultrasonic waves transmitted from ultrasonic sensor 2a on a transmitting side are reflected by flow path bottom surface 5, pass through propagation paths P1, P2, and reach ultrasonic sensor 2b on a receiving side. When the ultrasonic waves are transmitted from ultrasonic sensor 2b, the ultrasonic waves are reflected by flow path bottom surface 5 and reach ultrasonic sensor 2a. Flow rate calculator 7 calculates a measured flow rate based on a propagation time of the ultrasonic waves between ultrasonic sensors 2a, 2b.

Note that, as will be described later, the ultrasonic waves transmitted from ultrasonic sensors 2a, 2b propagate mainly to layered flow path 12. As described above, since a flow rate of a fluid to be measured is measured in layered flow path 12, hereafter, layered flow path 12 will be referred to as a measurement flow path, and layered flow paths 13a, 13b will be referred to as non-measurement flow paths, for convenience.

Ultrasonic sensors 2a, 2b to are mounted on mounting portions 3a, 3b without gaps, so that the fluid to be measured is prevented from flowing from other than flow path inlet 10 and flow path outlet 11. As illustrated in FIGS. 2B and 2C, opening 14b is formed on an upstream side of layered flow path 12, which is the measurement flow path, and opening 14e is formed on a downstream side of layered flow path 12, which is the measurement flow path. Openings 14a, 14c are formed on an upstream side of layered flow paths 13a, 13b, which are the non-measurement flow paths, and openings 14d, 14f are formed on a downstream side of layered flow paths 13a, 13b, which are the non-measurement flow paths.

Mounting portions 3a, 3b need to mount ultrasonic sensors 2a, 2b at an angle with respect to flow path 1 so that the ultrasonic waves can be transmitted and received between the pair of ultrasonic sensors 2a, 2b. Therefore, space 9a exists between ultrasonic sensor 2a and openings 14a to 14c, and space 9b exists between ultrasonic sensor 2b and openings 14d to 14f.

Figure 3A:
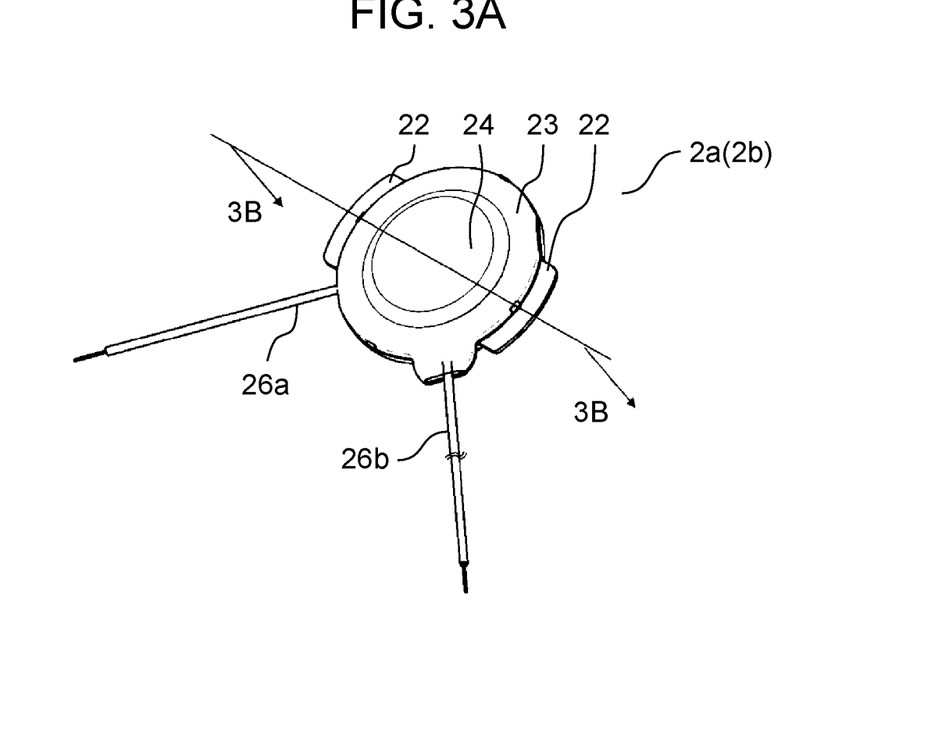
FIG. 3A is a perspective view of an ultrasonic sensor of the ultrasonic flowmeter according to the exemplary embodiment.
Figure 3B:
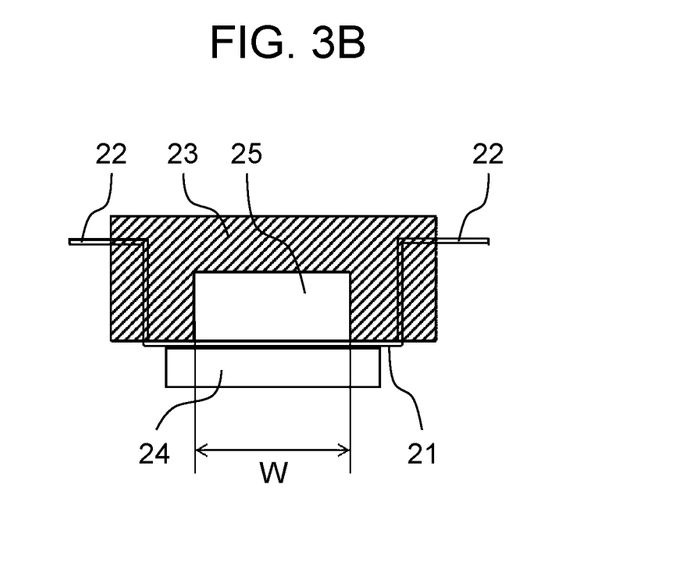
FIG. 3B is a cross-sectional view taken along line 3B-3B of FIG. 3A.

FIG. 3A is a perspective view of the ultrasonic sensor of the ultrasonic flowmeter according to the exemplary embodiment. FIG. 3B is a cross-sectional view taken along line 3B-3B of FIG. 3A.

As illustrated in FIGS. 3A and 3B, in ultrasonic sensors 2a, 2b, acoustic matching layer 24 is adhered to one surface of metal support 21 with an adhesive, and piezoelectric element 25 is adhered to the other surface of support 21 with a conductive adhesive. Lead wire 26a is electrically connected to an electrode of piezoelectric element 25 that is not adhered to support 21, and lead wire 26b is electrically connected to support 21, and is electrically connected, via support 21, to an electrode of piezoelectric element 25 that is adhered to support 21.

Furthermore, a portion other than acoustic matching layer 24 is covered with insulating vibration damping member 23, but support 21 has two facing portions extending outward from insulating vibration damping member 23. On the portions of support 21 extending outward from insulating vibration damping member 23, mounted portions 22 each formed in an arc shape are formed, and mounted portions 22 are fixed to mounting portion 3a, 3b. In addition, ultrasonic sensors 2a, 2b are connected to flow rate calculator 7 via lead wires 26a, 26b.

Furthermore, a size of piezoelectric element 25 is such that length W of a side in a direction perpendicular to partition plates 8 illustrated in FIG. 3B is equivalent to a width of layered flow path 12, which is the measurement flow path, in the direction perpendicular to partition plates 8, that is, the width of layered flow path 12, which is the measurement flow path, and a portion having acoustic matching layer 24 faces opening 14b, 14e of layered flow path 12, which is the measurement flow path. Therefore, the ultrasonic waves radiated from ultrasonic sensors 2a, 2b mainly propagate only in layered flow path 12, which is the measurement flow path. As a result, the size of piezoelectric element 25 can be reduced and costs required for ultrasonic sensors 2a, 2b can be reduced as compared with a case of measuring all layers.

Flow path 1 has a rectangular cross section, and layered flow path 12, which is the measurement flow path, and layered flow paths 13a, 13b, which are the non-measurement flow paths, have rectangular cross-sectional shapes having the same dimensions. Openings 14a, 14b, 14c and openings 14d, 14e, 14f are rectangles having the same dimensions, and formed so that sides in the direction perpendicular to partition plates 8 are aligned on the same line, as illustrated in FIG. 2C.

Figure 4:
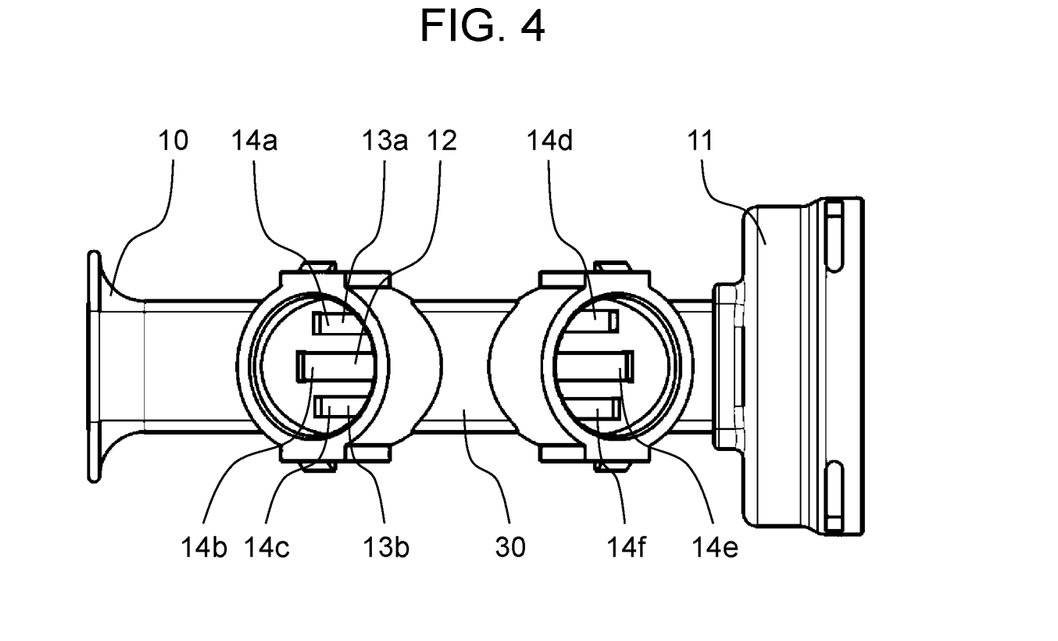
FIG. 4 is a plan view of a flow path in which areas of openings are adjusted in the ultrasonic flowmeter according to the exemplary embodiment.

Note that, since the flow velocity is not the same between layered flow path 12, which is the central measurement flow path, and layered flow paths 13a, 13b, which are the non-measurement flow paths, as in flow path 30 illustrated in FIG. 4, cross-sectional areas of layered flow path 12, which is the measurement flow path, and layered flow paths 13a, 13b, which are the non-measurement flow paths, and sizes of openings 14a, 14b, 14c, 14d, 14e, 14f may be adjusted so that a change in the flow velocity ratio is a target value. Furthermore, each of shapes of openings 14a to 14f may be a shape other than a rectangle, for example, an uneven shape may be provided on a side, or an edge or a side may be formed in an arc shape.

Around openings 14a to 14f, flows and vortices are generated and influence pressure losses of layered flow path 12, which is the measurement flow path, and layered flow paths 13a, 13b, which are the non-measurement flow paths. Therefore, when openings 14b, 14e are formed only in layered flow path 12, which is the measurement flow path, different flows and vortices are generated around the openings depending on the flow rate, temperature, gas type, or the like, and the flowability of the fluid to be measured in layered flow path 12, which is the measurement flow path, is influenced, which causes a change in the flow velocity ratio that cannot be corrected.

In the present exemplary embodiment, since openings 14a to 14f are formed in all layers, the shape of each layered flow path is the same, and flow conditions can be the same. Thus, even if the flow rate, temperature, gas type, or the like changes, the flow velocity ratio does not easily vary. As a result, it is possible to measure the flow rate with higher accuracy.

Figure 5:
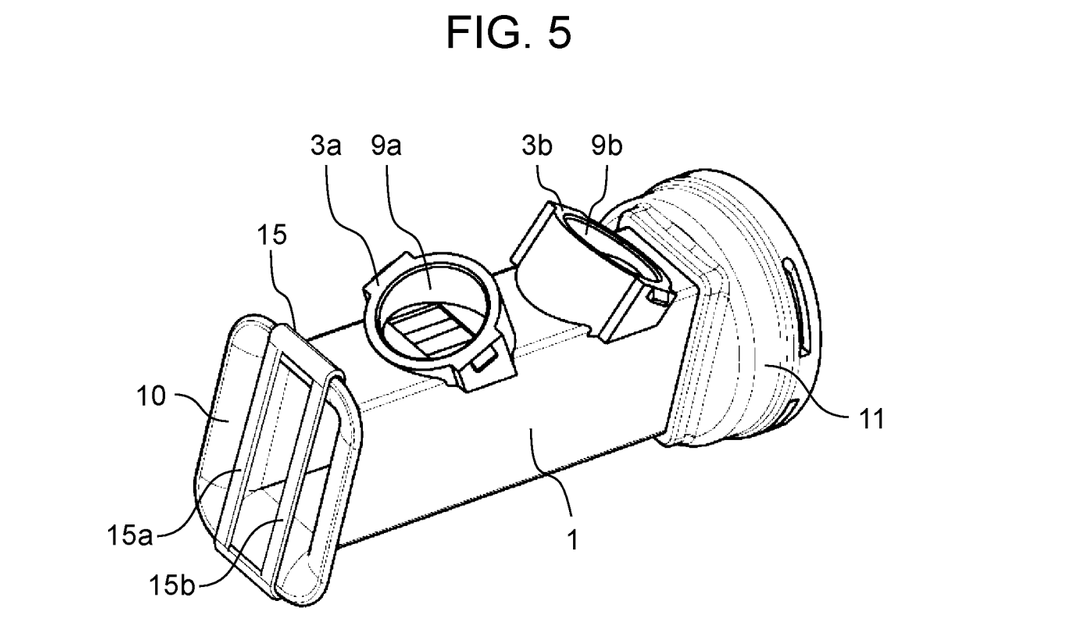
FIG. 5 is a perspective view of a flow path on which a turbulence mechanism is mounted in the ultrasonic flowmeter according to the exemplary embodiment.

Furthermore, as illustrated in FIG. 5, flow path inlet 10 may be provided with turbulence device 15 including two rod-shaped portions 15a, 15b connecting two opposite sides of flow path inlet 10 to make the fluid to be measured turbulent. Turbulence device 15 is mounted on flow path inlet 10 and makes the fluid to be measured flowing into flow path inlet 10 turbulent. Furthermore, turbulence device 15 may be integrally molded with flow path inlet 10, and may have a mesh structure. When the same flow rate flows through layered flow path 12, which is the measurement flow path, and layered flow paths 13a, 13b, which are the non-measurement flow paths, the flows and vortices generated around the openings 14a to 14f are equal between layered flow path 12, which is the measurement flow path, and layered flow paths 13a, 13b, which are the non-measurement flow paths, even if the flow rate, temperature, gas type, or the like changes. When the fluid to be measured is turbulent at flow path inlet 10, the fluid to be measured flows evenly to layered flow path 12, which is the measurement flow path, and layered flow paths 13a, 13b, which are the non-measurement flow paths, and as a result, the variations in the flow velocity ratio can be further suppressed, and the flow rate can be measured with higher accuracy.

As described above, an ultrasonic flowmeter in a first disclosure includes a flow path that has a rectangular cross section and through which a fluid to be measured flows, a partition plate that divides the flow path into a plurality of layers to form layered flow paths, and a pair of ultrasonic sensors that are arranged upstream and downstream of a surface forming the flow path and transmitting and receiving ultrasonic signals. Furthermore, the ultrasonic flowmeter includes a flow rate measurer that detects a flow rate of the fluid to be measured based on a propagation time from when the ultrasonic signals are transmitted from one of the pair of ultrasonic sensors until when the ultrasonic signals are received by another one of the pair of ultrasonic sensors after propagating through the fluid to be measured, mounting portions that mount the ultrasonic sensors on the flow path, and openings that are provided directly below the mounting portions and through which ultrasonic waves pass. Furthermore, each of the openings has a size facing a plurality of layers of the layered flow paths, and the ultrasonic sensors mainly propagate the ultrasonic waves only to a part of the layers of the layered flow paths.

With this configuration, it is possible to measure the flow rate with high accuracy by eliminating a difference in influence by an opening on the flow velocity of a measurement flow path and a non-measurement flow path to suppress variations in a flow velocity ratio while costs are reduced as compared with a conventional ultrasonic flowmeter.

In the ultrasonic flowmeter in a second disclosure, particularly in the first disclosure, the number of the layered flow paths may be an odd number, and the ultrasonic sensors may mainly propagate the ultrasonic waves to a central layer of the layered flow paths.

In the ultrasonic flowmeter in a third disclosure, particularly in the first disclosure, each of the ultrasonic sensors may include a metal support and a piezoelectric element bonded to the metal support, and a width of a vibration surface of the piezoelectric element is substantially same as a width of the layer that propagates the ultrasonic waves.

In the ultrasonic flowmeter in a fourth disclosure, particularly in the second disclosure, each of the ultrasonic sensors may include a metal support and a piezoelectric element bonded to the metal support, and a width of a vibration surface of the piezoelectric element is substantially same as a width of the layer that propagates the ultrasonic waves.

In the ultrasonic flowmeter in a fifth disclosure, particularly in any one of the first to fourth disclosures, the flow path may be provided with a turbulence device that makes the fluid to be measured turbulent at an inlet portion through which the fluid to be measured passes.

With this configuration, the flow velocity ratio between the measurement flow path and the non-measurement flow path is uniform, so that it is possible to measure the flow rate with high accuracy while the costs are reduced as compared with the conventional ultrasonic flowmeter.

INDUSTRIAL APPLICABILITY

As described above, the ultrasonic flowmeter according to the present disclosure can measure the flow rate with high accuracy by keeping the flow velocity of the measurement flow path and the non-measurement flow path uniform to suppress variations in the flow velocity ratio while reducing costs as compared with the conventional ultrasonic flowmeter, and thus can be applied to applications of household flowmeters and industrial flowmeters.

REFERENCE MARKS IN THE DRAWINGS 1, 30: flow path
2a, 2b: ultrasonic sensor
3a, 3b: mounting portion
7: flow rate calculator
8: partition plate
9a, 9b: space
12: layered flow path (measurement flow path)
13a, 13b: layered flow path (non-measurement flow path)
14a, 14b, 14c, 14d, 14e, 14f: opening
15: turbulence device
21: support
25: piezoelectric element

The invention claimed is:

1. An ultrasonic flowmeter comprising:
   a flow path that has a rectangular cross section and through which a fluid to be measured flows;
   a plurality of partition plates that divide the flow path into a plurality of layers to form plural layered flow paths, including a measurement flow path and a non-measurement flow path;
   a pair of ultrasonic sensors that are arranged upstream and downstream along a surface forming the flow path, and that transmit and receive ultrasonic signals;
   a flow rate calculator that detects a flow rate of the fluid to be measured based on a propagation time from when the ultrasonic signals are transmitted from one of the pair of ultrasonic sensors until when the ultrasonic signals are received by another one of the pair of ultrasonic sensors after propagating through the fluid to be measured;
   mounting portions that mount the ultrasonic sensors on the flow path; and
   plural openings that are provided directly below the mounting portions and that are provided respectively above the plural layered flow paths such that each opening corresponds to a layered flow path,
   wherein the ultrasonic sensors have a width equivalent to a width of the measurement flow path and are situated so as to propagate the ultrasonic waves only to the measurement flow path.

2. The ultrasonic flowmeter according to claim 1 wherein, the number of the layered flow paths is an odd number, and the measurement flow path is a central layer of the layered flow paths.

3. The ultrasonic flowmeter according to claim 2 wherein each of the ultrasonic sensors includes a metal support and a piezoelectric element bonded to the metal support, and a width of a vibration surface of the piezoelectric element is the same as a width of the part of the layers of the layered flow paths that propagates the ultrasonic waves.

4. The ultrasonic flowmeter according to claim 3 wherein the flow path is provided with a turbulence device that makes the fluid to be measured turbulent at an inlet portion through which the fluid to be measured passes.

5. The ultrasonic flowmeter according to claim 2 wherein the flow path is provided with a turbulence device that makes the fluid to be measured turbulent at an inlet portion through which the fluid to be measured passes.

6. The ultrasonic flowmeter according to claim 1 wherein each of the ultrasonic sensors includes a metal support and a piezoelectric element bonded to the metal support, and a width of a vibration surface of the piezoelectric element is the same as a width of the part of the layers of the layered flow paths that propagates the ultrasonic waves.

7. The ultrasonic flowmeter according to claim 6 wherein the flow path is provided with a turbulence device that makes the fluid to be measured turbulent at an inlet portion through which the fluid to be measured passes.

8. The ultrasonic flowmeter according to claim 1 wherein the flow path is provided with a turbulence device that makes the fluid to be measured turbulent at an inlet portion through which the fluid to be measured passes.

* * * * *